United States Patent [19]
Finger

[11] 3,871,398
[45] Mar. 18, 1975

[54] LIQUID-BARRIER GAS VENT
[75] Inventor: John F. Finger, Beresford, S. Dak.
[73] Assignee: Sioux Steam Cleaner Corp., Beresford, S. Dak.
[22] Filed: Feb. 7, 1974
[21] Appl. No.: 440,396

[52] U.S. Cl........ 137/253, 137/247.25, 137/247.41, 137/247.49
[51] Int. Cl. .............................................. F16k 9/00
[58] Field of Search..... 137/247.25, 247.41, 247.45, 137/247.49, 251, 253

[56] References Cited
UNITED STATES PATENTS

| | | | |
|---|---|---|---|
| 237,362 | 2/1881 | Bennor | 137/247.25 X |
| 1,069,655 | 8/1913 | Van Denberg | 137/247.25 |
| 2,468,360 | 4/1949 | Dressel | 137/247.45 |

FOREIGN PATENTS OR APPLICATIONS

| | | | |
|---|---|---|---|
| 337,625 | 11/1930 | United Kingdom | 137/247.45 |

Primary Examiner—Harold W. Weakley

[57] ABSTRACT

A liquid-barrier gas vent for preventing the passage of gas except in response to a pressure differential across the vent. The gas vent has a sealing chamber located between two openings in the vent for containing a liquid which acts as a barrier to the passage of ambient gas. Two overflow reservoirs are used for temporarily holding the sealing liquid when it is displaced from the sealing chamber by gas moving through the vent in response to a pressure differential across the vent openings. The overflow reservoirs communicate with the sealing chamber in such a way as to reduce the possibility of spilling of the sealing liquid when the vent is tipped.

5 Claims, 2 Drawing Figures

PATENTED MAR 18 1975

3,871,398

LIQUID-BARRIER GAS VENT

BACKGROUND OF THE INVENTION

1. Field of the Invention

This invention pertains to liquid-barrier vents for use with systems which draw vacuums or create pressure buildups.

2. Description of the Prior Art

It is frequently necessary to vent gas to or from a tank or an enclosed system. Such venting serves to relieve a pressure buildup or to break a vacuum, either of which frequently occur in closed systems where liquid is conveyed. An example would be a closed tank which is repeatedly filled and emptied of a liquid. When liquid is added to the tank, the air or gas in the tank must be vented. When the tank is emptied, a vacuum is drawn in the tank and this must be vented to allow the emptying of the tank.

Such venting is most commonly accomplished in one of two ways. First, a continually open vent is left in the system for venting gas. Secondly, a mechanical, normally closed, vent is often used which is moved to an open position in response to a pressure differential. Such mechanical systems usually use springs or rubber devices for maintaining the vent in its closed position.

Each of these types of vent have serious limitations. In the case of the continually open vent, spillage of liquids from the system out the vent opening can occur and various contaminants can enter the system through the vent. In the case of mechanical vents, the mechanical parts frequently break down, wear out or leak.

A third general type of venting device is used less frequently. This is the liquid-barrier type vent. This vent functions by using a quantity of liquid as a barrier between an inlet and an outlet. The liquid prevents the passage of generally ambient gas but "opens" in response to a sufficient pressure differential between the inlet and outlet of the vent which moves the liquid out of the passageway, permitting the gas to pass through the vent. Such vents have the advantage that they offer a continuous barrier to the passage of gas or gas-borne contaminants when there is insufficient pressure differential across the vent and do not contain mechanical parts which can easily wear out or malfunction. For example, when such a vent is used with a tank of chemicals, the vent prevents the escape of the gas evaporating from the chemicals. Yet, if the evaporation causes a pressure build-up in the tank, the vent will open allowing the pressure to be relieved. Examples of liquid-barrier gas vents are shown in U.S. Pat. No. 208,139 (Austin) and U.S. Pat. No. 2,070,204 (Hetzer).

Presently existing liquid-barrier gas vents are relatively complex in their construction and do not provide means for preventing the spilling of sealing liquid into other parts of the system when the vent is tipped to angles of up to 90° from horizontal. This would bw particularly detrimental where the vent is a part of a mobile system carried by a truck or other vehicle which may tilt or sway during transport. This poses a problem of contamination of the system from the sealing liquid or depletion of the liquid seal to the point where the vent does not function. In addition, existing liquid-barrier vents which utilize multiple-passageways for the flow of liquid within the vent contain numerous conduits. This multiplicity of passageways and conduits increases the likelihood of clogging by contaminants carried by the passing gas or the sealing liquid. This in turn would cause a breakdown in the functioning of the vent. In addition, such systems are relatively expensive to construct.

SUMMARY OF THE INVENTION

The present invention is a liquid-barrier gas vent to prevent the passage of ambient gas and to permit the passage of gas in response to a pressure differential across the vent. The vent is comprised of a U-shaped sealing chamber having two openings for connection with the system to be vented. The sealing chamber contains a supply of sealing liquid which in its normal position prevents the passage of ambient gas through the chamber between the two openings. Two overflow reservoirs communicate with the sealing chamber near each opening. When a pressure differential exists between the inlet and the outlet, the sealing liquid is displaced from the sealing chamber into either one of the overflow reservoirs to provide an open passageway for gas to be vented through. When the gas has been vented and there is no longer a pressure differential between the two openings, the liquid held in the overflow reservoirs flows back into the sealing chamber to again seal the vent.

The use of a single-route passageway between the overflow reservoirs and the sealing chamber provides a simple vent which is relatively easy to manufacture. Further, the use of a single-route passageway eliminates the need for multiple conduits which could become clogged by foreign matter from the sealing liquid or the gas passing through the chamber. The contour and positioning of the overflow reservoirs allows them to better retain sealing liquid which may otherwise spill out of the vent when it is tipped up to 90° from the horizontal. An inlet tube is provided in the sealing chamber for adding sealing liquid and an outlet valve is provided for draining the sealing liquid from the vent.

DETAILED DESCRIPTION OF THE PREFERRED EMBODIMENT

Figure 1:
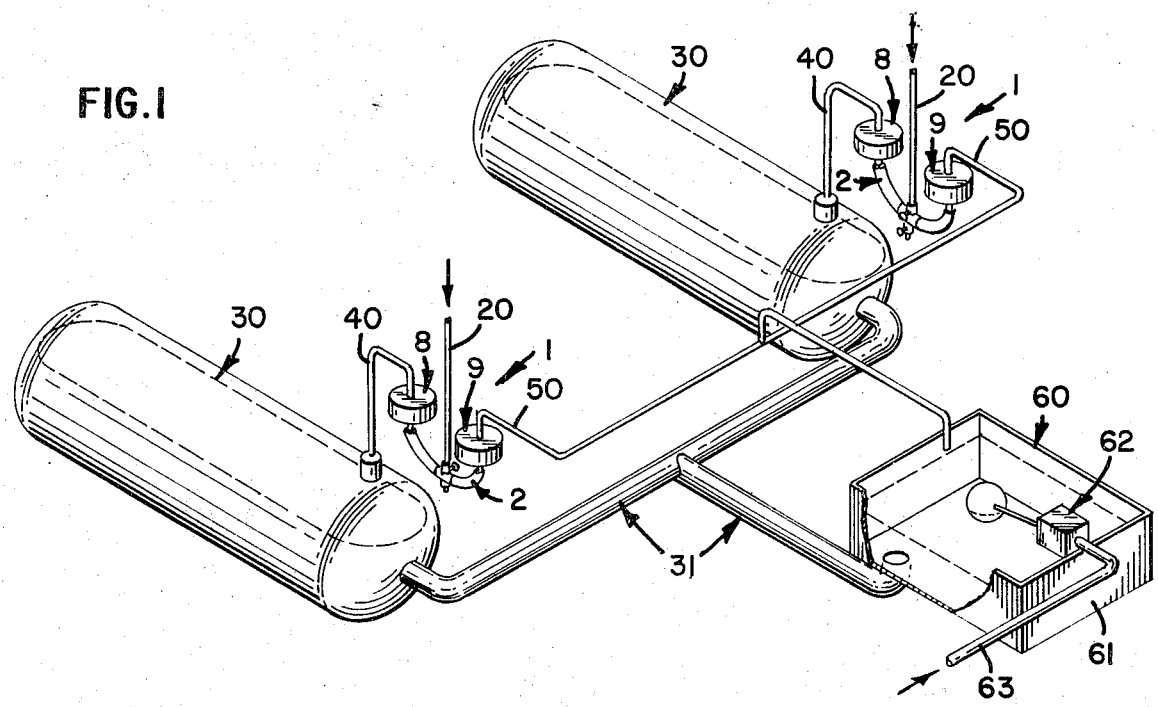
FIG. 1 is a perspective view of a liquid storage system showing the installation of liquid-barrier gas vents.

Referring to FIG. 1 wherein like numerals are used to designate like structural elements, liquid-barrier gas vent 1 is shown connected to a storage tank 30. The gas vent 1 operates to vent gas from tank 30 through tank conduit 40 and out vent conduit 50 when pressure buildup occurs in tank 30 and also operates to allow air to pass through vent conduit 50 into tank 30 when a vacuum is created in tank 30 by the drainage of liquid from it.

The storage tank system shown in FIG. 1 is a two-tank system wherein two liquid-barrier gas vents, each designated by the numeral 1, are utilized on two storage tanks, each designated by the numeral 30, to vent air to and from the tanks as the liquid level (shown by dotted lines) within the tanks varies. In the particular configuration shown in FIG. 1, a float-controlled replenishing tank 60 is used to fill the storage tanks 30. A float-control valve 62 controls the flow of liquid through inlet pipe 63, into storage reservoir 61 and through fill pipe 31 to the tanks 30. Other means of filling the storage tanks 30 may also be used.

Figure 2:
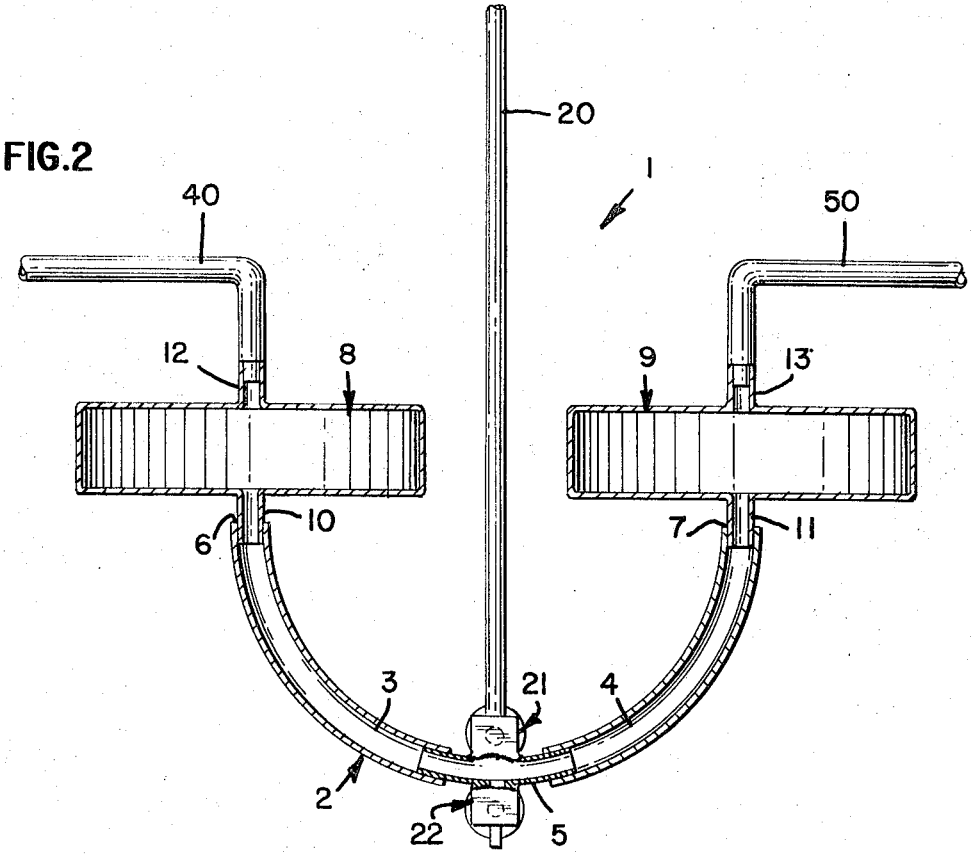
FIG. 2 is a partial sectional side view of the liquid-barrier gas vent.

As is shown in FIG. 2, the liquid-barrier gas vent 1 is comprised of a U-shaped sealing chamber 2 which has an overflow reservoir (8 and 9) attached to each of its open ends 6 and 7. Opening 6 is in communication with tank conduit 40 from tank 30 and opening 7 is in communication with vent conduit 50 which is open to the atmosphere. It is the purpose of sealing chamber 2 to retain a supply of sealing liquid within it which prevents the passage of ambient gas between openings 6 and 7. In this way, the sealing liquid acts as a barrier between the gases contained in tank conduit 40 and vent conduit 50. This prevents the entry of airborne contaminants into tank 30 and also prevents the escape of vapors contained within tank 30 which would otherwise pass through tank conduit 40 and out vent conduit 50.

In the embodiment shown in FIG. 2, sealing chamber 2 is comprised of a left-hand portion 3 and a right-hand portion 4 which are joined together by a union tube 5. The purpose of this particular arrangement is to facilitate the inclusion of a fill tube 20 and a drain valve 22 into sealing chamber 2 to add and remove the sealing liquid. In the embodiment of FIG. 2, fill tube 20 connects to a fill valve 21 which is used to regulate the addition of sealing liquid to the sealing chamber 2. The fill valve 21 may be of any commercial type which provides a liquid and gas seal when it is in its closed position. This prevents the passage of contaminants or gas through fill tube 20 into sealing chamber 2. Similarly, drain valve 22 has a fluid seal which allows the sealing liquid to be drained at will but when the valve is closed it prevents the passage of gas or contaminants into sealing chamber 2.

While sealing chamber 2 is shown as a U-shaped tube, other shapes may also be used which provide a simple, single-route passageway between openings 6 and 7. When sealing liquid is added to sealing chamber 2, it is retained in a normal position in the base of sealing chamber 2 with its normal level below openings 6 and 7. With the sealing liquid in its normal position, gas vent 1 is closed to the passage of air between tank conduit 40 and vent conduit 50.

It is the purpose of gas vent 1 to allow the passage of air between tank conduit 40 and vent conduit 50 when a sufficient pressure differential exists between these two conduits. Such a condition would exist when liquid is added to tank 30 causing pressure to be exerted on the gas contained in the tank. It would then be necessary to vent the gas in the top of the tank to provide additional volume for the added liquid. This trapped gas must pass through tank conduit 40, into and through gas vent 1 and out vent conduit 50. Venting must also occur when liquid is drained from tank 30 and a vacuum is drawn in the top of the tank. In this case, gas must be added to tank 30 by passing through vent conduit 50, into gas vent 1 and through tank conduit 40 into the tank 30.

To allow the passage of gas through gas vent 1 in either of these situations, the sealing fluid contained in sealing chamber 2 must be moved out of sealing chamber 2 so that the gas has an open passageway between tank conduit 40 and vent conduit 50. Overflow reservoirs 8 and 9 are used for this purpose. In the embodiment shown in FIGS. 1 and 2, overflow reservoirs 8 and 9 are cylindrical chambers located adjacent sealing chamber openings 6 and 7 respectively. Overflow reservoir 8 has an outlet pipe 10 and an inlet pipe 12. Outlet pipe 10 connects with opening 6 in sealing chamber 2 to provide a single-route passageway between the reservoir and the sealing chamber. Inlet pipe 12 connects to the tank conduit 40. Similarly, overflow reservoir 9 has an inlet pipe 13 connected to vent conduit 50 and an outlet pipe 11 connected to the opening 7 in sealing chamber 2 to provide a single passageway for the gas.

Since the operation of overflow reservoirs 8 and 9 is essentially identical, only one of them will be referred to in describing the operation of both. The volume of overflow reservoir 8 is such that it can contain the entire volume of sealing fluid contained in sealing chamber 2 and at the same time allow gas to pass through it between outlet pipe 10 and inlet pipe 12. In this way, an unobstructed path is provided for gas to pass through gas vent 1 between tank conduit 40 and vent conduit 50. The sealing liquid is moved from its normal position in sealing chamber 2 into overflow reservoir 8 by a positive pressure differential caused by a pressure in vent conduit 50 which is greater than the pressure in tank conduit 40. When this pressure differential occurs and is sufficiently strong to overcome the inertia of the sealing liquid in its normal position, such as when a vacuum is drawn in the top of holding tank 30, the pressure differential forces the sealing liquid out of sealing chamber 2 into overflow reservoir 8. The sealing liquid is forced into the outside portions of overflow reservoir 8 thus providing an open passageway between outlet pipe 10 and inlet pipe 12. When the pressure has equalized between vent conduit 50 and tank conduit 40, the sealing liquid in overflow reservoir 8 is free to pass back to its normal location in sealing chamber 2 to again seal the gas vent 1.

Similarly, when the pressure in tank conduit 40 is greater than the pressure in vent conduit 50, such as when there is a pressure buildup in holding tank 30 as liquid is added to it, the sealing liquid in sealing chamber 2 is forced into overflow reservoir 9. The volume of overflow reservoir 9 is such that it can fully contain the sealing liquid from sealing chamber 2 while at the same time leaving a clear passageway between reservoir inlet pipe 13 and reservoir outlet pipe 11. When the pressure has equalized between tank conduit 40 and vent conduit 50, the sealing liquid contained in overflow reservoir 9 passes back into sealing chamber 2 to again seal the gas vent 1.

Because there is open space in each of the overflow reservoirs 8 and 9 on either side of the inlet and outlet pipes leading to and from them, the gas vent 1 may function even when it is tipped at a steep angle in any direction. Such tipping may occur when the storage tank system, including the gas vent 1, is carried in a truck or other vehicle. Similarly, the configuration and location of overflow reservoirs 6 and 7 also help prevent the spillage of the sealing liquid out of the gas vent 1 into either the holding tank 30 or vent conduit 50 when the vent is tipped. By preventing such spilling of the sealing liquid, the contamination of the contents of storage tank 30 is prevented and the seal maintained by the gas vent 1 is not destroyed. While the embodiment shown in FIGS. 1 and 2 show the overflow reservoirs 8 and 9 as being cylinders and the sealing chamber 2 as being a separate U-tube, other manners of constructing the gas vent 1 may also be used.

The functioning of liquid barrier gas vent 1 can be summarized as follows. The gas vent 1 is inserted in a system of tanks or conduits which requires venting when a pressure buildup or reduction occurs. The gas vent 1 is inserted between two conduits (e.g., 40 and 50). When a sufficient pressure buildup occurs in either conduit, it forces the sealing liquid which is contained in sealing chamber 2 out of the sealing chamber 2 and into either reservoir 8 or 9, depending on which vent opening (e.g., 6 or 7) has the greater pressure in it. When the sealing liquid is moved into either reservoir 8 or 9, an open path exists between the two conduits (40 and 50) so that gas can pass between them through gas vent 1. When the pressure in the two conduits (40 and 50) is equal, the liquid which had been urged into the overflow reservoir (8 or 9) by the pressure differential is free to flow back to its normal location in the sealing chamber 2. In this location, the sealing liquid seals the pathway between the two conduits (40 and 50) and prevents the passage of ambient air between them.

What is claimed is:

1. A gas vent of the liquid-barrier type, comprising:
   a. a sealing chamber having a single inlet and a single outlet, the inlet of which communicates through a first overflow reservoir to a system to be sealed and the outlet of said sealing chamber communicating through a second overflow reservoir to a discharge means;
   b. means for filling at least a portion of said sealing chamber with a sealing liquid to thereby provide a liquid seal to restrain the passage of gas through said chamber, said liquid moveable through said chamber in response to a pressure imbalance between said inlet and outlet caused by venting gas;
   c. the volume of each of said overflow reservoirs being sufficient to retain all said sealing liquid that can be displaced from the sealing chamber by venting gas; and
   d. each of said reservoirs being elevated relative to the liquid seal portion of said sealing chamber and each permitting gravity return of displaced sealing liquid to said sealing chamber when the pressure imbalance between said inlet and outlet is removed.

2. The gas vent of claim 1 including means for draining the sealing liquid from said sealing chamber.

3. A gas vent of the liquid-barrier type comprising:
   a. a U-shaped sealing chamber having a single inlet and a single outlet, the inlet of which communicates through a first overflow reservoir to a system to be sealed and the outlet of said sealing chamber communicating through a second overflow reservoir to a discharge means;
   b. means for filling at least a portion of said sealing chamber with a sealing liquid to thereby provide a liquid seal to restrain the passage of gas through said chamber, said liquid moveable in said chamber in response to a pressure imbalance between said inlet and outlet caused by venting gas;
   c. the volume of each of said overflow reservoirs being sufficient to retain all of said sealing liquid that can be displaced from the sealing chamber by venting gas; and
   d. each of said overflow reservoirs permitting gravity return of displaced sealing liquid to said sealing chamber when the pressure imbalance between said inlet and outlet is removed.

4. The gas vent of claim 3 wherein each of said overflow reservoirs is cylindrical and positioned relative to said U-shaped sealing chamber with the cylinder longitudinal axis generally parallel to the sides of said U-shaped sealing chamber.

5. The gas vent of claim 4 and including valve means for draining the sealing liquid from said sealing chamber.

* * * * *